United States Patent [19]
Jin

[11] Patent Number: 5,659,361
[45] Date of Patent: Aug. 19, 1997

[54] TILTABLE, ROTATABLE AND DETACHABLE LCD VIEWFINDER

[75] Inventor: Hong Jae Jin, Kyungki-Do, Rep. of Korea

[73] Assignee: LG Electronics Inc., Seoul, Rep. of Korea

[21] Appl. No.: 695,379

[22] Filed: Aug. 9, 1996

Related U.S. Application Data

[63] Continuation of Ser. No. 400,830, Mar. 8, 1995, abandoned.

[30] Foreign Application Priority Data

Mar. 10, 1994 [KR] Rep. of Korea ............... 4684/1994

[51] Int. Cl.$^6$ .................. H04N 5/225; H04N 5/222
[52] U.S. Cl. ................. 348/75; 348/333; 348/373; 403/58; 248/921; 361/681
[58] Field of Search ................. 348/333, 373, 348/375, 376; 403/57, 58, 62, 74; 439/10, 162, 164, 165; 361/681, 682; 248/917, 918, 919, 920, 921, 922, 923; H04N 5/222, 5/225

[56] References Cited

U.S. PATENT DOCUMENTS

| | | | |
|---|---|---|---|
| 2,502,925 | 4/1950 | Case | 403/58 |
| 2,802,633 | 8/1957 | Moore | 403/58 |
| 4,682,240 | 7/1987 | Bachman | 348/333 |
| 4,757,388 | 7/1988 | Someya et al. | 358/224 |
| 5,003,330 | 3/1991 | Kotani et al. | 354/145 |
| 5,119,203 | 6/1992 | Hosaka et al. | 348/375 |
| 5,381,179 | 1/1995 | Kashimura | 348/376 |

FOREIGN PATENT DOCUMENTS

| | | | |
|---|---|---|---|
| 0581286 | 2/1994 | European Pat. Off. | H04N 5/225 |
| 1106581 | 4/1989 | Japan | H04N 5/225 |
| 4100382 | 2/1992 | Japan | H04N 5/225 |

OTHER PUBLICATIONS

Patent Abstracts of Japan, vol. 016 No. 336 (E-1237) 21 Jul. 1992 & JP-A-04 100382.
Patent Abstracts of Japan, vol. 016 No. 112 (E-1180) 19 Mar. 1992 & JP-A-03 284068.

*Primary Examiner*—Andrew Faile
*Assistant Examiner*—Andrew B. Christensen

[57] ABSTRACT

A tiltable, rotatable and detachable LCD view finder for a camcorder that enables a user to easily take pictures while viewing the LCD viewfinder. The viewfinder can be rotated 360° and tilted 180° relative to the upper surface of the camcorder body. The viewfinder system includes: an LCD (Liquid Crystal Display) viewfinder; a downwardly opened recess formed on a predetermined edge portion of said LCD viewfinder and having a first side wall, a second side wall, a back wall and a semicircular end; and a tiltable, rotatable and detachable compound joint assembly member fitted into said recess for tiltably, rotatably and detachably connecting the LCD viewfinder, whereby the LCD viewfinder can be tilted, rotated, and detached relative to the camcorder body.

19 Claims, 7 Drawing Sheets

TILTABLE, ROTATABLE AND DETACHABLE LCD VIEWFINDER

This application is a continuation of application Ser. No. 08/400,830 filed on Mar. 8, 1995, now abandoned.

BACKGROUND OF THE INVENTION

1. Field of the Invention

The present invention relates to a tiltable, rotatable and detachable LCD (Liquid Crystal Display) viewfinder, and particularly to a tiltable, rotatable and detachable LCD viewfinder for a camcorder capable of enabling a user to easily take pictures while viewing the LCD viewfinder detachably mounted for 360° rotation on the upper surface of the camcorder body.

2. Description of the Conventional Art

Referring to FIG. 1, there is shown a perspective view of a first conventional camcorder provided with a camcorder body 1a consisting of a camera section 100 and an LCD viewfinder section 200. Here, the camera section 100 is provided with an objective lens 3a through which the images of objects are passed, and the LCD viewfinder section 200 is provided with a 270° tiltable LCD viewfinder 2a including a screen 2a'for viewing the images passed through the objective lens 3a.

Referring to FIG. 2, there is shown a perspective view of a second conventional camcorder provided with a camcorder body 1b consisting of a camera section 100a and a 60° tiltable viewfinder section 200a. Here, the camera section 100a is provided with an eyepiece for directly viewing pictures passed through an objective lens (not shown) with the eyes, and the LCD viewfinder section 200a is provided with a LCD viewfinder 2b including a screen 2b'for viewing the images passed through the objective lens (not shown).

The operation of both conventional camcorders will now be explained with reference to FIGS. 1 and 2.

To begin with, in the first conventional camcorder, when taking pictures, the user holds the camcorder body 1a with their one hand while holding a predetermined portion thereof using their other hand for tilting the LCD viewfinder 2a within a range of 270°, whereby the user can see the images on the screen 2a'while standing behind the camcorder body 1a. In addition, when user wants to take higher-angled pictures, the user can take the pictures while watching the images on the screen 2a'from a position above the camcorder body 1a by keeping the camcorder body 1a at a relatively lower position than the user's eyes.

However, when the user wants to take lower-angled pictures, the user has to view the screen 2a'from a position below the cameorder body 1a. In this case, when the user tilts the LCD viewfinder 2a clockwise to its maximum downward travel, the screen 2a'faces toward the ground, but the images on the screen are upside down, whereby the user can not easily recognize the images and thus effective picture-taking is made impossible. In addition, it is inconvenient to carry the camcorder due to the relatively heavy viewfinder section always being attached thereto.

Next, in the second conventional camcorder, when taking pictures using the camcorder, the user holds the camcorder body 1b with their one hand while holding a predetermined portion thereof using with their other hand for tilting the LCD viewfinder 2b within a range of 60°, whereby the user can see the images on the screen 2b'while standing behind the camcorder body 1a.

In addition, when the user wants to take higher-angled pictures, the user takes the pictures while watching the images on the screen 2b'from a position above the camcorder body 1b by keeping the camcorder body 1b at a relatively lower position than their eyes. However, when the user wants to take lower-angled pictures, the user has to view the screen 2b'from a position below the camcorder body 1a. In this case, when the user fits the LCD viewfinder 2b downwardly to its maximum travel, the screen 2a'is stopped by its tilting limitation of 60°, whereby the user can not easily see the screen 2b'positioned relatively upwardly and thus effective picture-taking is made impossible. In addition, it is also inconvenient to carry the camcorder due to the relatively heavy viewfinder section always being attached thereto.

SUMMARY OF THE INVENTION

Accordingly, it is an object of the present invention to provide a tiltable, rotatable and detachable LCD viewfinder.

It is another object of the present invention to provide a tiltable, rotatable and detachable LCD viewfinder for a camera capable of enabling a user to easily take pictures while viewing the LCD viewfinder detachably mounted for 360° rotation on the upper surface of the camcorder body.

To achieve the above objects, there is provided a tiltable, rotatable and detachable LCD viewfinder for a camcorder, which includes a LCD (Liquid Crystal Display) view finder; a downwardly opened recess formed on a predetermined edge portion of said LCD viewfinder and having a first side wall, a second side wall, a back wall and a semicircular end 10d; and a tiltably (along a tilt axis), rotatable and detachable member fitted into said recess for tiltably, rotatably (along a rotation axis) and detachably connecting the LCD viewfinder to the camcorder body, whereby the LCD viewfinder is pivotable about the rotation axis irrespective of the orientation along the tilt axis of the LCD viewfinder relative to the camcorder body.

DETAILED DESCRIPTION OF THE INVENTION

Figure 1:
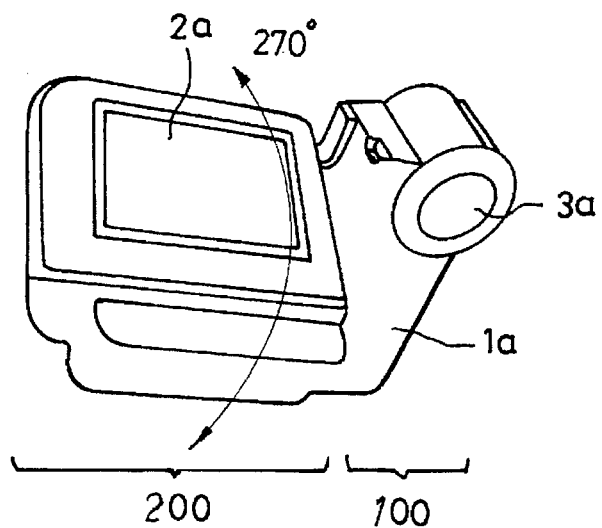
FIG. 1 is a perspective view of a first conventional camcorder equipped with a LCD viewfinder.
Figure 2:
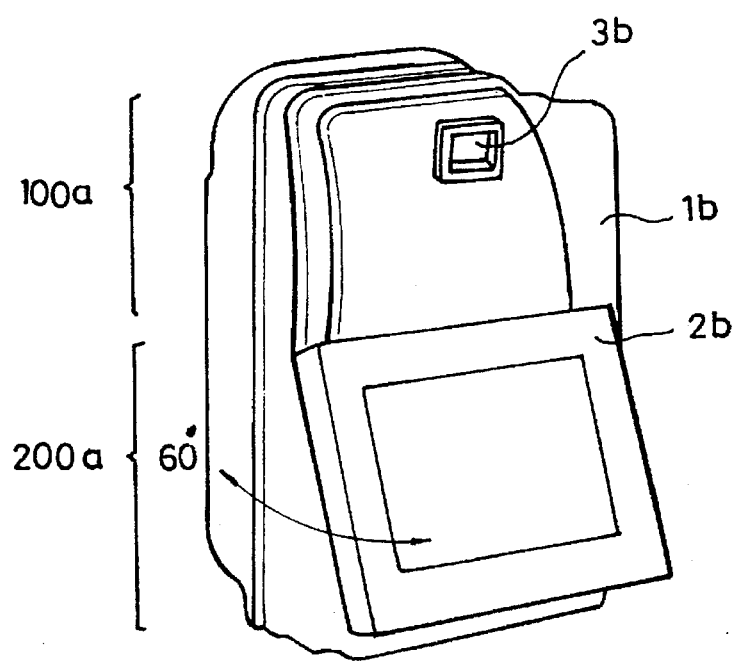
FIG. 2 is a perspective view of a second conventional camcorder equipped with a LCD viewfinder.
Figure 3A:
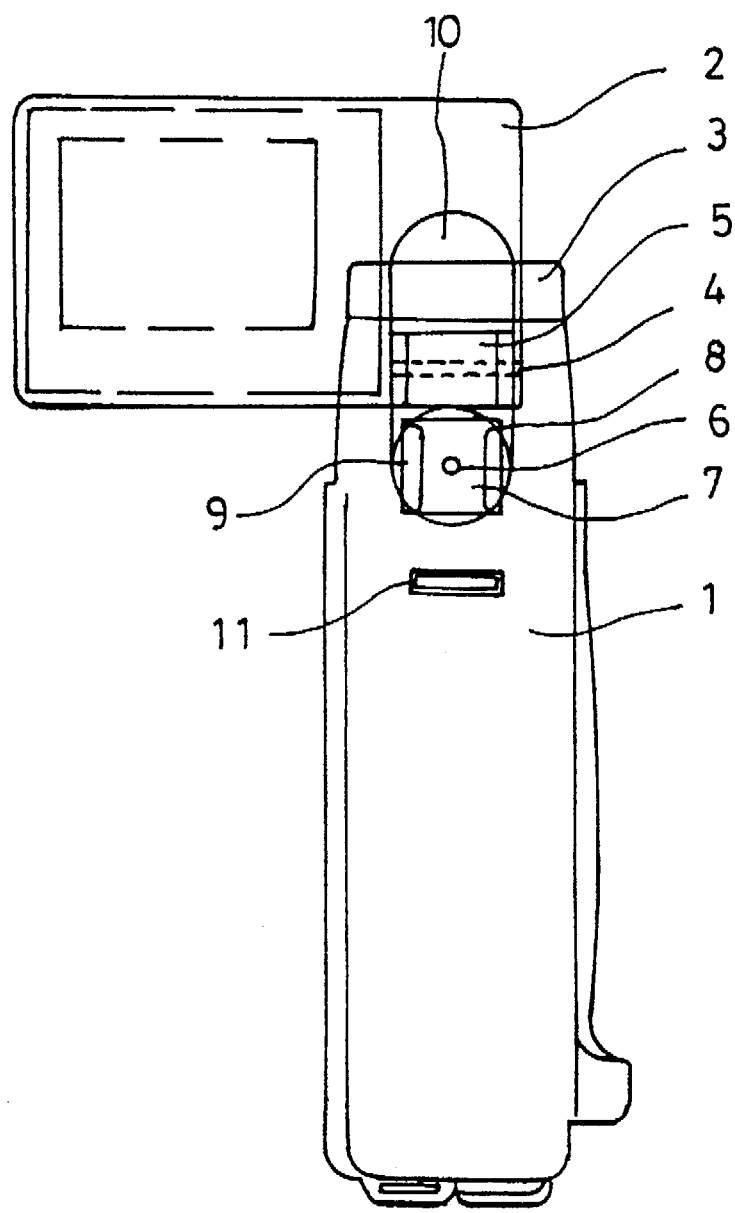
FIG. 3A is a top view showing a camcorder equipped with a fitable, rotatable and detachable LCD viewfinder for a camcorder according to the present invention.
Figure 3B:
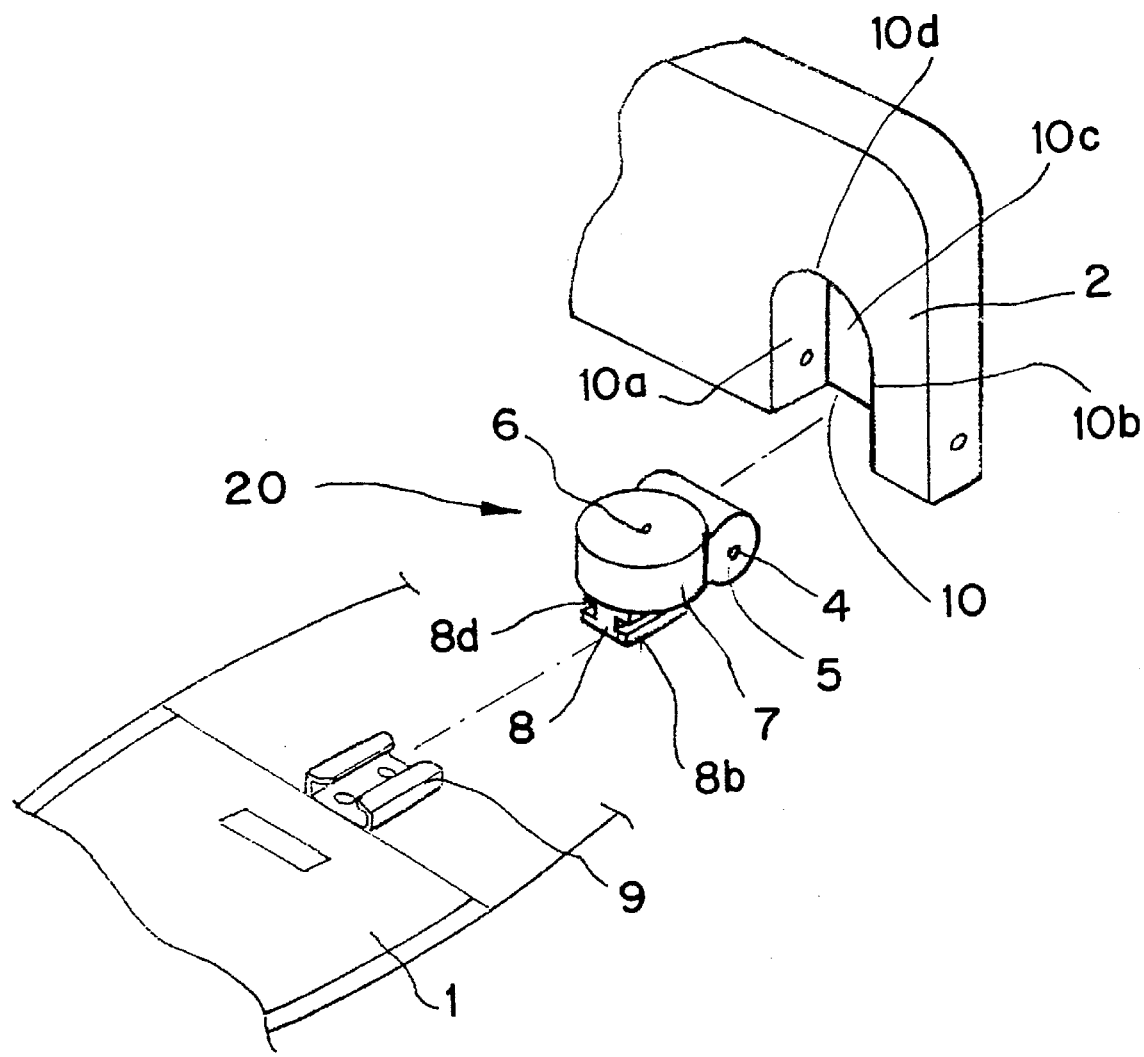
FIG. 3B is an exploded perspective view showing a camcorder equipped with a tiltable, rotatable and detachable LCD viewfinder for a camcorder according to the present invention.

Referring to FIGS. 3A and 3B, there is shown a camcorder construction equipped with a tiltable, rotatable and detachable LCD viewfinder for a camcorder according to the present invention.

As shown therein, the camcorder is provided with a camcorder body 1. The camcorder body 1 is provided with an objective lens 3 on a predetermined front portion thereof and a light mounting member 9 on a predetermined portion of the upper surface of the camcorder body 1.

In addition, there is provided a substantially flat LCD viewfinder 2 including a downwardly opened recess 10 having a first side wall 10a, a second side wall 10b, a back wall 10c, and a semicircular end 10d and formed on a predetermined edge portion thereof.

In addition, there is provided a tiltable, rotatable and detachable member 20 including a horizontal joint 5 having a horizontal shaft 4 one end of which is fixed to a predetermined portion of the first side wall 10a and the other end of which is fixed to a predetermined portion of the second side wall 10b, a vertical joint 7 integrally formed with the horizontal joint 5, and a detaching section 8 including a vertical shaft 6 rotatably fitted to the vertical joint 7, one end of which is fixed to a predetermined portion of the upper surface of the detachable mounting 8, and the other end of which is rotatably upwardly extended through the vertical joint 7. Here, the detachable mounting 8 includes a pair of grooves 8a formed on both sides thereof and a pair of feet 8b and is detachably fitted into the light mounting member 9.

The operation of a tiltable, rotatable and detachable LCD viewfinder for a camcorder according to the present invention will now be explained with reference to FIGS. 4A to 8C.

Figure 4A:
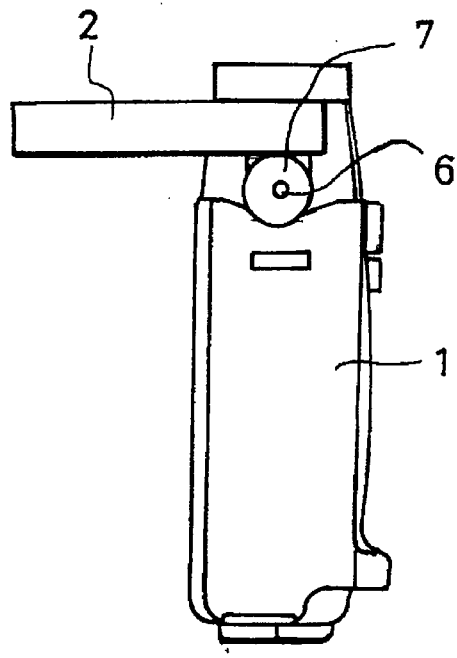
FIG. 4A is a top view of a camcorder equipped with a tiltable, rotatable and detachable LCD viewfinder for a camcorder according to the present invention when the LCD viewfinder stands vertically on the upper surface of the camcorder body and the screen faces in a rearward direction.
Figure 4B:
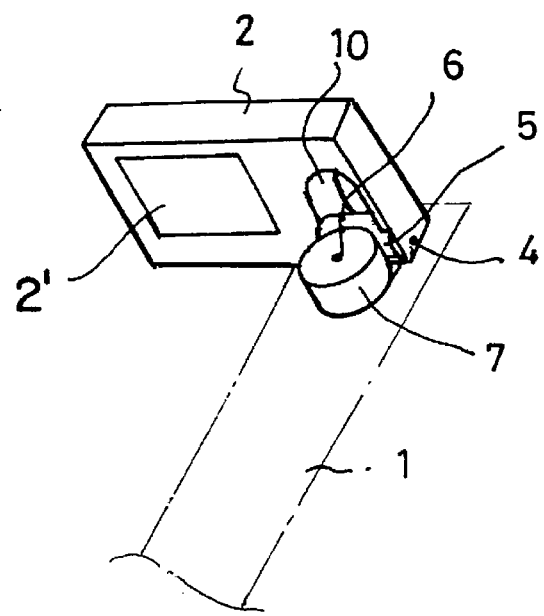
FIG. 4B is a perspective view of a camcorder equipped with a tiltable, rotatable and detachable LCD viewfinder for a camcorder according to the present invention when the LCD viewfinder stands vertically on the upper surface of the camcorder body and the screen faces in a rearward direction.

To begin with, as shown in FIGS. 4A and 4B, the screen 2' of the viewfinder 2 tightly faces in a backward direction of the camcorder body 1. In the above state, the user takes the pictures coming through the object lens 3 while viewing the images which is to be taken from the viewfinder 2. At this time, the vertical joint 7 is directed to rotate the LCD viewfinder 2 clockwise/counterclockwise through 360° and the horizontal joint 5 is directed to tilt the LCD viewfinder 2 upwardly/downwardly through 180° by holding and rotating a predetermined portion thereof with one hand. In this case, the objects to be taken are positioned in front of the camcorder body 1, and the eyes of the user is positioned behind the camcorder body 1, so that the user can take pictures while viewing the screen 2' of the viewfinder 2.

Figure 5A:
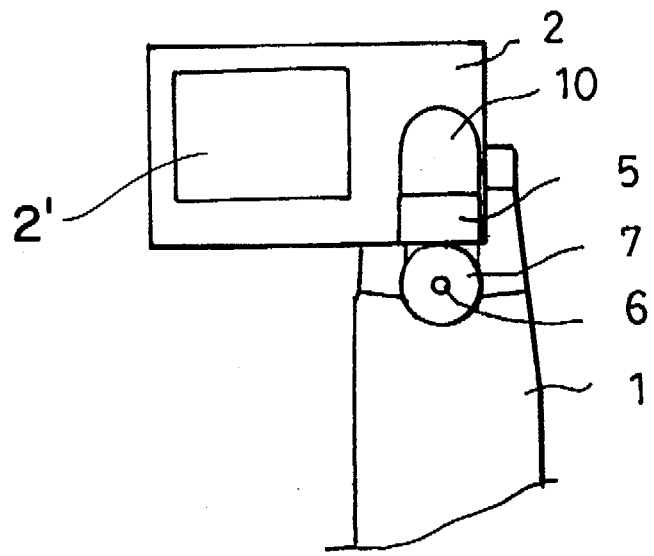
FIG. 5A is a top view of a camcorder equipped with a rotatable and detachable apparatus for a LCD viewfinder according to the present invention when the LCD viewfinder stands horizontally on the upper surface of the camcorder body and the screen faces in an upward direction.
Figure 5B:
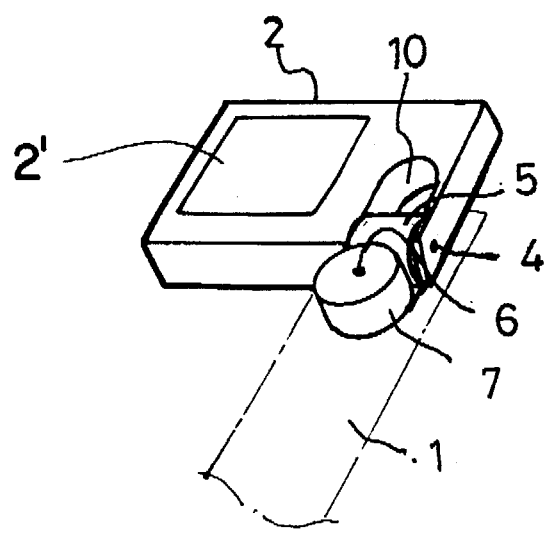
FIG. 5B is a perspective view of a camcorder equipped with a tiltable, rotatable and detachable LCD viewfinder for a camcorder according to the present invention when the LCD viewfinder stands horizontally on the upper surface of the camcorder body and the screen faces in an upward direction.

Referring to FIGS. 5A and 5B, in this case, the screen 2' of the viewfinder 2 rightly faces in an upward direction of the camcorder body 1 by tilting the LCD viewfinder 2 upwardly from the position in FIG. 4A. In the above state, the user takes the pictures in the same manner as in the method of FIGS. 4A and 4B. At this time, the vertical joint 7 is also directed to rotate the LCD viewfinder clockwise/counterclockwise, and the horizontal joint 5 is also directed to tilt the LCD viewfinder upwardly/downwardly. In this case, the objects to be taken are positioned in front of the camcorder body 1, and the eyes of the user is positioned above the screen 2', and the body of the user is positioned at a predetemined position around the camcorder body 1, so that the user can take pictures while viewing the screen 2' of the viewfinder 2.

Figure 6A:
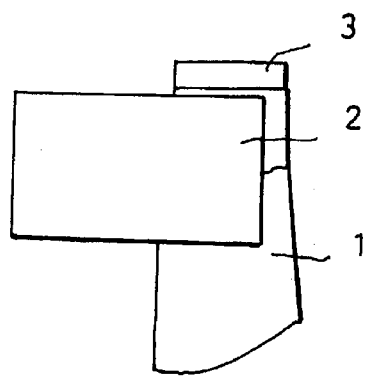
FIG. 6A is a top view of a camcorder equipped with a rotatable and detachable apparatus for a LCD viewfinder according to the present invention when the LCD viewfinder stands horizontally on the upper surface of the camcorder body and the screen faces in a downward direction.
Figure 6B:
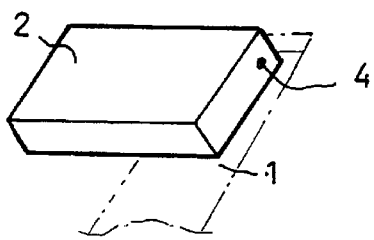
FIG. 6B is a perspective view of a camcorder equipped with a tiltable, rotatable and detachable LCD viewfinder for a camcorder according to the present invention when the LCD viewfinder stands horizontally on the upper surface of the camcorder body and the screen faces in a downward direction.

Referring to FIGS. 6A and 6B, in this case, the screen 2' of the viewfinder 2 rightly faces in a downward direction of the camcorder body 1 by tilting the LCD viewfinder 2 forwardly from the position of in FIG. 5A. In the above state, the user also takes the pictures in the same manner as in the method of FIGS. 4A and 4B. At this time, the vertical joint 7 is also directed to rotate the LCD viewfinder clockwise/counterclockwise, and the horizontal joint 5 is also directed to fit the LCD viewfinder upwardly/downwardly. In this case, the objects to be taken are positioned in front of the camcorder body 1, and the eyes of the user is positioned below the screen 2' and the body of the user is positioned below the screen 2' and, thus, below the camcorder body 1, so that the user can take pictures while viewing the screen 2' of the viewfinder 2.

Figure 7A:
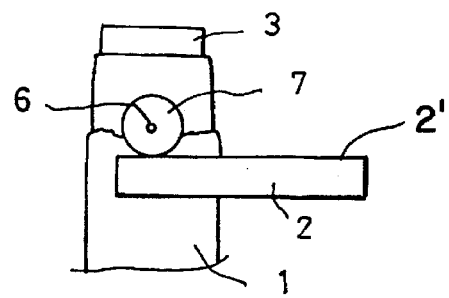
FIG. 7A is a top view of a camcorder equipped with a tiltable, rotatable and detachable LCD viewfinder for a camcorder according to the present invention when the LCD viewfinder stands vertically on the upper surface of the camcorder body and the screen faces in a forward direction.
Figure 7B:
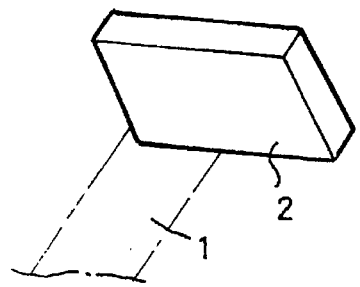
FIG. 7B is a perspective view of a camcorder equipped with a tiltable, rotatable and detachable LCD viewfinder for a camcorder according to the present invention when the LCD viewfinder stands vertically on the upper surface of the camcorder body and the screen faces in a forward direction.

Referring to FIGS. 7A and 7B, in this case, the screen 2' of the viewfinder 2 rightly faces in a forward direction of the camcorder body 1 by rotating the upper portion thereof in a counterclockwise direction by 180° from the position of FIG. 4A. In the above state, user also takes the pictures in the same manner as in the method of FIGS. 4A and 4B. At this time, the vertical joint 7 is also directed to rotate the LCD viewfinder clockwise/counterclockwise, and the horizontal joint 5 is also directed to fit the LCD viewfinder upwardly/downwardly. In this case, the objects to be taken are positioned in front of the camcorder body 1, and the eyes of the user is also positioned in front of the camcorder body 1, and the body of the user is positioned in front of the camcorder body, so that the user can take pictures of himself/herself while viewing the screen 2' of the viewfinder 2.

Figure 8A:
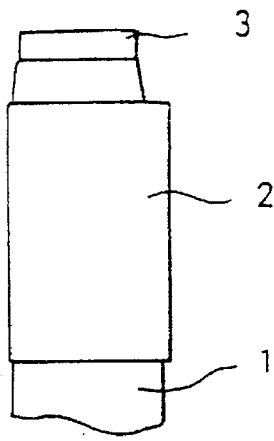
FIG. 8A is a top view of a camcorder equipped with a tiltable, rotatable and detachable LCD viewfinder for a camcorder according to the present invention when the LCD viewfinder stands horizontally on the upper surface of the camcorder body with the screen sufficiently covering the upper surface of the camcorder body when stowed and not in use.
Figure 8B:
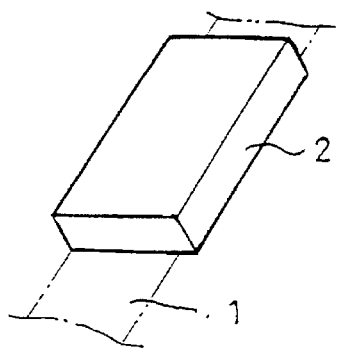
FIG. 8B is a perspective view of a camcorder equipped with a tiltable, rotatable and detachable LCD view finder for a camcorder according to the present invention when the LCD viewfinder stands horizontally on the upper surface of the camcorder with the screen sufficiently covering the upper surface of the camcorder when stowed and not in use.
Figure 8C:
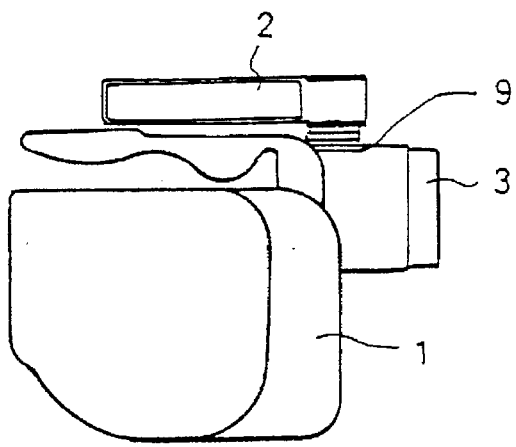
FIG. 8C is a side view of a camera equipped with a tiltable, rotatable and detachable LCD viewfinder according to the present invention when the LCD viewfinder stands horizontally on the upper surface of the camcorder body with the screen sufficiently covering the upper surface of the camcorder when stowed and not in use.

Referring to FIGS. 8A to 8C, in this case, the screen 2' rightly faces the upper surface of the camcorder body 1 by rotating the edge portion thereof in a counterclockwise direction from the position in FIG. 6A that is, the screen 2' substantially covers a predetermined surface of the upper surface of the camcorder body 1, so that when the user carries the camcorder for a predetermined time, the screen 2' of the viewfinder 2 is safely protected from unforeseeable outside impacts.

As described above, the present invention is directed to provide a tiltable, rotatable and detachable LCD viewfinder for a camcorder capable of advantageously taking higher-angled and/or lower-angled pictures, and in particular taking himself/herself while viewing the images on the screen of the viewfinder mounted thereto from any positions around the camcorder. In addition, user can carry only the camcorder body by separating the viewfinder from the light mounting member of the camcorder body.

What is claimed is:

1. A tiltable, rotatable and detachable LCD viewfinder for a camcorder having a housing, the viewfinder comprising:
   a LCD (Liquid Crystal Display) viewfinder;
   a downwardly opened recess formed on a predetermined edge portion of said LCD viewfinder and having a first side wall, a second side wall, a back wall and a semicircular end; and
   a compound joint assembly connecting the LCD viewfinder to the camcorder housing, the joint assembly including:
      a rotatable and detachable joint, attached to the camcorder housing and fitted into said recess, rotatably, along a rotation axis, and detachably connecting to the camcorder housing; and
      a tiltable joint, directly connected to the rotatable and detachable joint and fitted into said recess, tiltably, along a tilt axis, joining the LCD viewfinder to the rotatable and detachable joint;
   wherein the LCD viewfinder is pivotable about the rotation axis irrespective of the orientation along the tilt axis of the LCD viewfinder relative to the camcorder body and such that a ray normal to and emanating from an image-forming surface of the flat panel display can be oriented parallel, and also anti-parallel, to a ray emanating from an object lens of the camcorder toward a subject thereof thereby enabling an operator of the camcorder himself to be the subject while viewing an upright image of himself on the image-forming surface.

2. The viewfinder of claim 1, wherein said first side wall and said second wall each includes a hole.

3. The viewfinder of claim 1, wherein:
   said tiltable, rotatable and detachable joint means includes a horizontal joint, vertical joint integrally formed with said horizontal joint and a detachable mounting.

4. The viewfinder of claim 3, wherein said horizontal joint includes a horizontal shaft, one end of which is fixed to a predetermined portion of said first side wall and the other end of which is fixed to a predetermined portion of said second side wall.

5. The viewfinder of claim 3, wherein said detaching mounting includes a pair of grooves formed on both sides thereof, a pair of feet provided below the grooves, and a vertical shaft, one end of which is fixed to a predetermined portion of the upper surface of said detachable mounting and the other end of which is upwardly extended.

6. The viewfinder of claim 5, further including:
   a light mounting member attached to the camera body;
   wherein said pair of feet are fitted into the light mounting member.

7. the viewfinder of claim 1, wherein:
   said tiltable, rotatable and detachable joint means is substantially received into the recess of the LCD viewfinder.

8. A viewfinder as in claim 1, wherein:
   the LCD viewfinder is rotatable through substantially 180° about the tilt axis.

9. A viewfinder as in claim 1, wherein:
   the LCD viewfinder is rotatable through substantially 360° about the rotation axis.

10. A flat panel viewfinder system for a camcorder, the camcorder having a housing, the system comprising:
    a flat panel display; and
    a compound joint assembly connecting the display to the camcorder housing, the joint assembly including:
       a first rotatable joint connected to the housing, the first joint providing a first axis of rotation perpendicular to a plane tangent to the camcorder housing; and
       a second rotatable joint connected to the first joint and to the display, the second joint providing a second axis of rotation perpendicular to the first axis;
    the flat panel display being pivotable about the first axis irrespective of the orientation along the second axis of the flat panel relative to the camcorder housing such that a ray normal to and emanating from an image-forming surface of the flat panel display can be oriented parallel, and also anti-parallel, to a ray emanating from an object lens of the camcorder toward a subject thereof thereby enabling an operator of the camcorder himself to be the subject while viewing an upright image of himself on the image-forming surface without having to invert an orientation of an image on said flat panel display.

11. A system as in claim 10, wherein:
    the first axis does not intersect the second axis.

12. A system as in claim 10, wherein:
    the flat panel is pivotable substantially 180° about the second axis.

13. A system as in claim 10, wherein:
    the flat panel display has a housing including a recess;
    the recess being shaped to conform to the shape of the compound joint assembly such that the compound joint assembly can fit within the recess.

14. A system as in claim 10, wherein:
    the compound joint assembly is detachable from the camcorder housing.

15. A system as in claim 14, further including:
    a foot and shoe mounting assembly by which the compound joint assembly is detachably connected to the camcorder housing.

16. A system as in claim 10, wherein:
    the flat panel display is a liquid crystal display (LCD).

17. A system as in claim 10, wherein:
    the flat panel display is pivotable at least 180° about the first axis.

18. A system as in claim 17, wherein:
the flat panel display is pivotable 360° about the first axis.

19. A system as in clain 10, wherein:
a thickness of the first rotatable joint defines a layer; and
the second joint is connected to the first joint such that the second joint is substantially contained within the layer.

* * * * *